(12) United States Patent
Gledhill et al.

(10) Patent No.: US 6,180,176 B1
(45) Date of Patent: Jan. 30, 2001

(54) ELASTOMER SURFACES OF ADHESIVE AND COATING BLENDS AND METHODS THEREOF

(75) Inventors: Heather C. Gledhill, Cheltenham; Roger L. Imm, Beam, Nr. Lydney; Allan J. Edwards, Lydney; David V. Pudge, Coleford, all of (GB)

(73) Assignee: Xerox Corporation, Stamford, CT (US)

( * ) Notice: Under 35 U.S.C. 154(b), the term of this patent shall be extended for 0 days.

(21) Appl. No.: 09/343,930

(22) Filed: Jun. 30, 1999

(51) Int. Cl.[7] .................................................. B05D 1/36
(52) U.S. Cl. .................... 427/387; 427/407.1; 427/419.7
(58) Field of Search ................................. 427/387, 407.1, 427/419.7

(56) References Cited

U.S. PATENT DOCUMENTS

| | | | |
|---|---|---|---|
| 4,257,699 | 3/1981 | Lentz | 355/3 FU |
| 4,672,003 * | 6/1987 | Letoffe | 428/447 |
| 4,711,818 * | 12/1987 | Henry | 428/421 |
| 4,743,474 * | 5/1988 | Homan | 427/387 |
| 4,853,737 * | 8/1989 | Hartley et al. | 355/289 |
| 5,166,031 * | 11/1992 | Badesha et al. | 430/124 |
| 5,217,837 * | 6/1993 | Henry et al. | 430/124 |
| 5,338,574 * | 8/1994 | O'Neil et al. | 427/387 |
| 5,370,931 * | 12/1994 | Fratangelo et al. | 428/334 |
| 5,695,878 | 12/1997 | Badesha et al. | 428/334 |
| 5,700,568 | 12/1997 | Badesha et al. | 428/334 |
| 5,744,200 | 4/1998 | Badesha et al. | 427/387 |
| 5,750,204 | 5/1998 | Badesha et al. | 427/387 |
| 5,753,307 | 5/1998 | Badesha et al. | 427/387 |
| 5,753,361 * | 5/1998 | Visser | 428/323 |
| 5,824,416 * | 10/1998 | Chen et al. | 428/422 |
| 5,928,794 * | 7/1999 | Kalinowski et al. | 427/387 |
| 6,037,092 * | 3/2000 | Heeks et al. | 430/124 |
| 6,052,550 * | 4/2000 | Thornton et al. | 399/237 |

* cited by examiner

*Primary Examiner*—Erma Cameron
(74) *Attorney, Agent, or Firm*—Annette L. Bade

(57) ABSTRACT

Elastomer surfaces and methods for providing elastomer surfaces on a supporting substrate which include a) dissolving an elastomer in an effective solvent, b) adding an adhesive primer to form an elastomer and primer solution, wherein the adhesive primer is preferably a vinyl siloxane, and c) subsequently providing at least one layer of the elastomer and primer solution to the supporting substrate to form a topcoat layer.

23 Claims, 4 Drawing Sheets

ELASTOMER SURFACES OF ADHESIVE AND COATING BLENDS AND METHODS THEREOF

BACKGROUND OF THE INVENTION

The present invention relates to elastomer surfaces and a process for providing an elastomer surface, and in preferred embodiments, a fluoroelastomer, hydrofluoroelastomer or VITON® hydrofluoroelastomer surface, on a supporting substrate. The resulting surfaces are useful as surfaces for components in electrostatographic processes, especially xerographic processes, including digital, image on image and contact electrostatic printing applications. The elastomer surfaces are useful as coatings for fuser members including donor members, pressure members, fuser or fixing members, toner transfer members, and like members. In embodiments, the present invention allows for a decrease in the number of steps normally necessary for preparing a coated fuser member, which decreases the unit manufacturing cost and decreases the time necessary for preparation of the fuser member. In general, with the present process, instead of coating an adhesive on a fuser member followed by coating a fluoroelastomer topcoat thereon, an adhesive or primer is mixed with the fluoroelastomer material and the adhesive/fluoroelastomer mixture is coated on the fuser member. The resulting elastomer coating has increased adhesion to the fuser member, resulting in a decrease in delamination of the elastomer layer, which in turn, results in longer fuser life.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner.

Several approaches to thermal fusing of electroscopic toner images have been described. These methods include providing the application of heat and pressure substantially concurrently by various means, a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and can be adjusted to suit particular machines or process conditions.

It is important in the fusing process that no offset of the toner particles from the support to the fuser member takes place during normal operations. Toner particles offset onto the fuser member may subsequently transfer to other parts of the machine or onto the support in subsequent copying cycles, thus increasing the ba background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Particularly preferred fusing systems are comprised of a heated cylindrical fuser roll having a fusing surface which is backed by a cylindrical pressure roll forming a fusing nip therebetween. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in an electrostatographic printing system.

Fusing systems using fluoroelastomers as fuser members are described in U.S. Pat. No. 4,264,181 to Lentz et al., U.S. Pat. No. 4,257,699 to Lentz, and U.S. Pat. No. 4,272,179 to Seanor, all commonly assigned to the assignee of the present invention.

U.S. Pat. No. 5,017,432 describes a fusing surface layer obtained from a specific fluoroelastomer, poly (vinylidenefluoride hexafluoropropylene tetrafluoroethylene) where the vinylidenefluoride is present in an amount less than 40 weight percent. The patent further discloses curing the fluoroelastomer with VITON® Curative No. 50 (VC-50) available from E.l. Du Pont de Nemours, Inc. which is soluble in a solvent solution of the polymer at low base levels and is readily available at the reactive sites for crosslinking. The patent also discloses use of a metal oxide (such as cupric oxide) in addition to VC-50 for curing.

U.S. Pat. No. 5,061,965 to Ferguson et al., discloses an elastomer release agent donor layer comprising poly (vinylidenefluoride-hexafluoropropylene-tetrafluoroethylene) and a metal oxide, where the vinylidenefluoride is present in an amount less than 40 weight percent. The release agent donor layer is cured with a nucleophilic curing agent in the presence of an inorganic base.

U.S. Pat. Nos. 5,338,587 and 5,366,772 disclose mixing a fluoroelastomer with a nucleophilic curative and methyl ethyl ketone solvent and spray coating the solution onto the roll.

U.S. Pat. No. 5,700,568 discloses a fusing surface which is prepared in the absence of metal oxides and wherein the outer fluoroelastomer layer is the reaction product of a fluoroelastomer, a polymerization initiator, a polyorganosiloxane and an amino silane.

U.S. Pat. No. 5,744,200 discloses a volume grafted elastomer prepared by dissolving a fluoroelastomer in a solvent, adding a nucleophilic dehydrofluorinating agent, preferably an amino silane which acts as both a dehydrofluorinating agent and curing agent, a polymerization initiator and a polyorganosiloxane in amounts sufficient to effect formation of a volume grafted fluoroelastomer, and providing a layer of the volume grafted fluoroelastomer to a substrate.

U.S. Pat. No. 5,695,878 discloses fluoroelastomer surfaces prepared by dissolving a fluoroelastomer, adding an amino silane to form a homogeneous fluoroelastomer solution, and providing a layer of the homogeneous fluoroelastomer solution to the supporting substrate.

U.S. Pat. No. 5,750,204 discloses fluoroelastomer surfaces prepared by dissolving a fluoroelastomer in a solvent, adding an amino silane to effect coupling and crosslinking and to form a resulting homogeneous fluoroelastomer solution, and subsequently providing a layer of the homogeneous fluoroelastomer solution to the supporting substrate.

U.S. Pat. No. 5,753,307 discloses fluoroelastomer surfaces prepared by dissolving a fluoroelastomer in a solvent, adding a dehydrofluorinating agent, adding an amino silane to form a resulting homogeneous fluoroelastomer solution, and subsequently providing at least one layer of the homogeneous fluoroelastomer solution to a substrate.

U.S. patent application Ser. No. 08/822,521 filed Mar. 26, 1997, discloses a flow coating solution comprising a fluoroelastomer, a nucleophilic crosslinking agent, and an effective solvent.

U.S. patent application Ser. No. 08/824,576 filed Mar. 26, 1997, discloses a fuser member comprising: a) a substrate; and thereover b) an amino silane adhesive coating comprising an amino silane composition and an organic phosphonium catalyst; and having thereon, c) a fluoroelastomer outer coating comprising a fluoroelastomer.

Generally, the process for providing the elastomer surface on the supporting substrate, e.g., donor member, pressure member, fuser member, toner transfer member, or like substrates, includes preparing a layered structure including, in order, 1) a fuser member substrate which can be a stainless steel or aluminum cylindrical core, 2) an adhesive layer, 3) a high temperature vulcanization (HTV) silicone rubber base layer which may include a thermally conductive filler, peroxide curative and colorant, 4) an adhesive or primer layer, and 5) at least one layer of preferably fluoroelastomer which may contain carbon black, and may include crosslinking agents and curing agents.

Therefore, a more cost effective and less time consuming method of providing a fluoroelastomer surface, which results in elastomers having sufficient bonding strength to lessen the occurrence of delamination is desired.

SUMMARY OF THE INVENTION

The present invention includes, in embodiments: a method for providing an elastomer surface on a fuser member supporting substrate comprising a) dissolving a fluoroelastomer in an effective solvent; b) adding an adhesive primer to form a fluoroelastomer and primer solution, wherein the primer comprises a vinyl siloxane; and c) subsequently providing at least one layer of the fluoroelastomer and primer solution to the supporting substrate to form a topcoat layer.

Embodiments of the present invention further include: a method for providing an elastomer surface on a fuser member supporting substrate comprising: i) providing a heat absorbent coating on an internal area of the fuser member supporting substrate; ii) providing an adhesive layer on the fuser member supporting substrate; iii) providing an elastomer layer on the adhesive layer, wherein the elastomer is a silicone elastomer; iv) forming a base coat layer comprising dissolving a fluoroelastomer in an effective solvent, adding an adhesive primer and thermally conductive filler to form a filled fluoroelastomer and primer solution, wherein the adhesive primer comprises a vinyl siloxane, and subsequently providing at least one layer of the fluoroelastomer and primer solution to the supporting substrate to form a base coat layer; and v) forming a topcoat layer comprising dissolving a fluoroelastomer in an effective solvent, adding an adhesive primer to form a fluoroelastomer and primer solution, wherein the adhesive primer comprises a vinyl siloxane, and subsequently providing at least one layer of the fluoroelastomer and primer solution on the base coat layer to form a topcoat layer.

In addition, embodiments include: a method for providing an elastomer surface on a fuser member supporting substrate comprising a) dissolving a fluoroelastomer in an effective solvent; b) adding an adhesive primer and thermally conductive filler to form a filled fluoroelastomer and primer solution, wherein the primer comprises a vinyl siloxane; c) subsequently providing at least one layer of the filled fluoroelastomer and primer solution to the supporting substrate to form a base coat layer; e) dissolving a fluoroelastomer in an effective solvent; f) adding an adhesive primer to form a fluoroelastomer and primer solution, wherein the primer comprises a vinyl siloxane; and g) subsequently providing at least one layer of the fluoroelastomer and primer solution to the base coat to form a topcoat layer.

DETAILED DESCRIPTION OF THE PRESENT INVENTION

Figure 1:
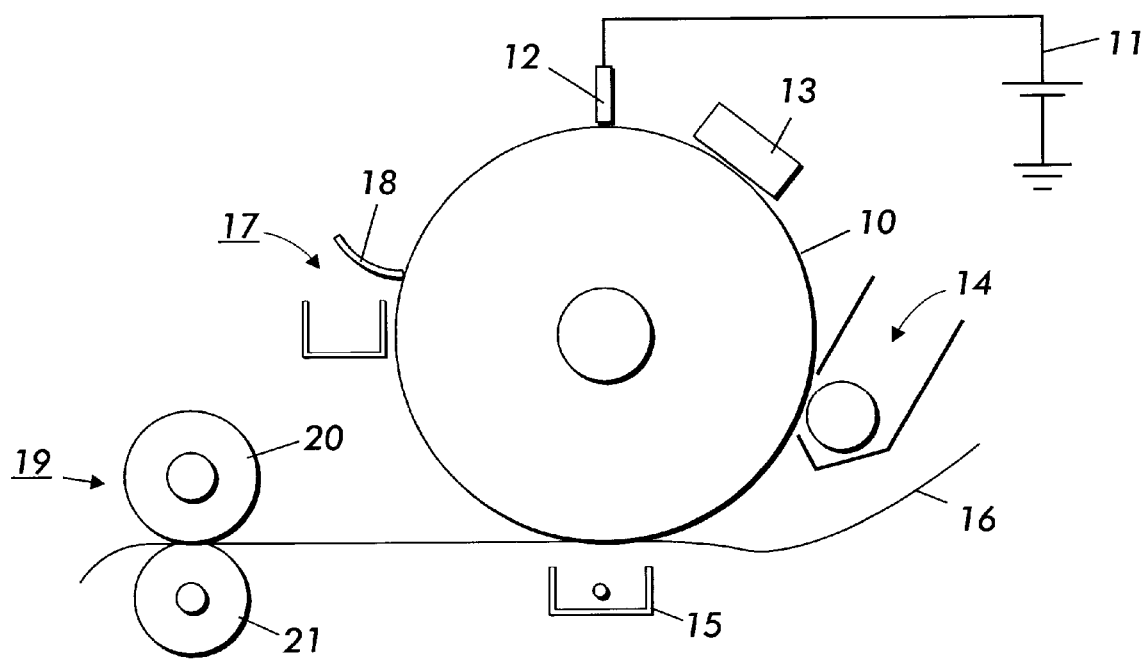
FIG. 1 is a schematic view of an embodiment of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fuser roll 20 and pressure roll 21, wherein the developed image is fused to copy sheet 16 by passing copy sheet 16 between the fusing and pressure members, thereby forming a permanent image. Photoreceptor 10, subsequent to transfer, advances to cleaning station 17, wherein any toner left on photoreceptor 10 is cleaned therefrom.

Figure 2:
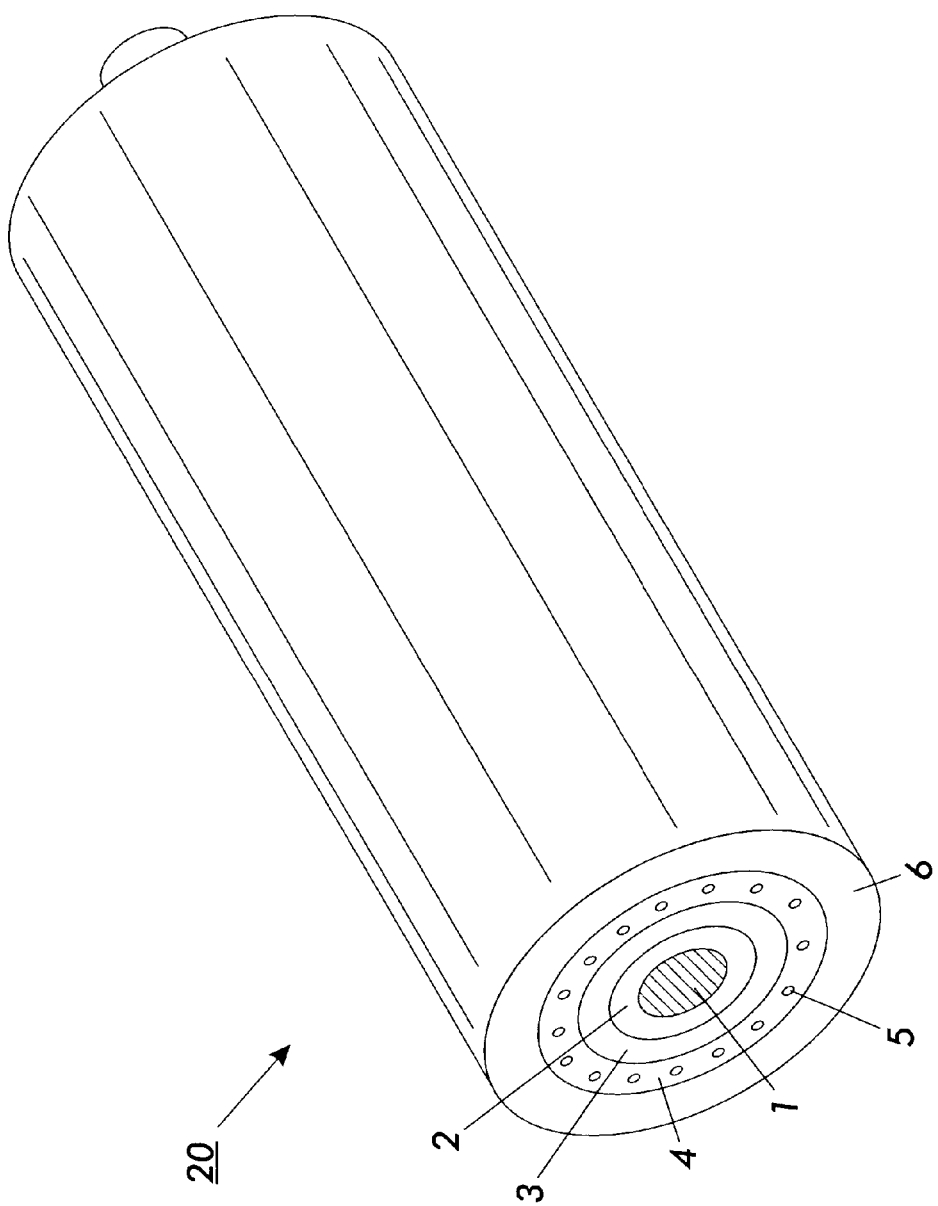
FIG. 2 is a sectional view of a fuser member in accordance with one embodiment of the invention.

FIG. 2 represents a preferred embodiment of the invention and includes a substrate 1 which may be a belt, film, sheet, roller, or like substrate member, and may comprise a plastic, metal, fabric or the like. In a preferred embodiment, the substrate is a cylindrical roller as shown in FIG. 2, comprising aluminum or stainless steel. It is preferred that the supporting substrate is a cylindrical sleeve. In another preferred embodiment, the substrate comprises a black non-reflective heat absorbent coating on the internal core diameter which encourages rapid conduction of heat from the internal heat source (such as a heat lamp) through the body of the substrate. Examples of heat absorbent coatings suitable for use herein include graphite commercially available coatings.

Optionally provided on the substrate is an intermediate layer 3. Preferably, the layer comprises a silicone rubber material, and preferably a high temperature silicone rubber. Examples include HTV or LSR Silicone rubbers with hardness ranges of from about 50 to about 75 Shore A, preferably from about 55 to about 70 Shore A, including, for example SILASTIC® by Toray D.C. Silicone such as DY32-6043U (HTV 55) or (HTV 58), DY35-3030 (LSR 33), Dow Corning 6395, 571-70-R10, DCP, and the like. In an embodiment wherein an intermediate layer is present on the substrate, it is preferred to coat the intermediate layer on an adhesive or primer layer 2. In an embodiment wherein the intermediate layer is a silicone rubber layer, it is preferable to use as the adhesive, a silicone adhesive primer in order to sufficiently bond the optional silicone rubber layer to the substrate. Examples of suitable silicone adhesive primers include vinyl trimethoxysilane, gamma-methacryloxy propyltrimethoxysilane, and vinyltris (t-butylperoxy) silane. Commercially available suitable silicone adhesives include Shin-Etsu Silicone Primer No. 18B in toluene or hexane, and other silicone adhesives available from Dow Corning, Toray and Wacker. Suitable primers or adhesives for intermediate layers comprising materials other than silicone elastomers include silanes and siloxanes such as those having the tradename Chemloke from Hughson Chemical Company, and epoxy adhesives or cements available under the tradename Thioxon® which is a trademark of Dayton Chemical Products Laboratory.

In one embodiment, a silicone rubber layer is applied to the substrate with primer, and is cured for up to 15 minutes and at 120° to 180° C. to provide a complete cure without a significant post cure operation. This curing operation should be substantially complete to prevent debonding of the silicone elastomer from the core when it is removed from the mold. Thereafter, the surface of the silicone elastomer is sanded to remove the mold release agent and it is wiped clean with a solvent such as isopropyl alcohol to remove all debris, or cleaned using compressed or ionized air such as that provided by an "air knife" system. The intermediate layer can also be prepared from fluoroelastomers like VITON GF®, wherein a typical composition is prepared, for example, by adding 30 parts per 100 parts of VITON GF® carbon black like REGAL N991®, followed by rubber milling in a Banbury Mixer and thereafter, injection molded onto a metal core. Alternatively, the intermediate layer may be formed in accordance with the present invention. The thickness of the intermediate layer is from about 0.5 to about 20 mm, preferably from about 1 to about 5 mm, and particularly preferred from about 2 to about 3 mm.

An optional base coat elastomer layer 4 is provided either directly on the substrate, or is provided on the optional intermediate layer 3. In a preferred embodiment, layer 4 includes optional filler 5 dispersed or contained in the layer 4. Examples of suitable fillers include thermally conductive fillers such as carbon black, graphite, metal oxide, or like filler. In a preferred embodiment, carbon black or graphite filler is dispersed or contained in the optional base coat elastomer layer 4. The filler is present in the elastomer base coat in an amount of from about 0 to about 15 weight percent, preferably from about 0.1 to about 10 weight percent, and particularly preferred from about 3 to about 7 weight percent by weight of total solids. As used herein, total solids refers to the total amount by weight of elastomer, fillers, additives, and like solids in the layer. It is preferred that the elastomer material of layer 4 is a fluoroelastomer. Specific examples of fluoroelastomers are set forth herein. The thickness of the base coat elastomer layer is from about 0.001 to about 60 mm, preferably from about 10 to about 20 mm, and particularly preferred about 15 mm.

A topcoat elastomer layer 6 is present on one of the substrate, optional intermediate layer, or base coat elastomer layer 4. In a preferred embodiment, the topcoat elastomer layer does not include any thermally conductive filler. Preferably, the topcoat elastomer layer is carbon black-free, in other words, does not contain any carbon black fillers. The topcoat thickness can vary depending upon specific applications to from about 10 to about 75 micrometers, preferably from about 15 to about 25 micrometers.

Generally, in a particularly preferred embodiment, the fuser member includes, in order, a substrate 1, adhesive layer 2, intermediate layer 3, base coat elastomer layer 4 and thereon, topcoat elastomer layer 6. Preferably, the base coat elastomer layer 4 includes filler 5, for example carbon black, and topcoat elastomer layer 6 does not include a carbon black filler, although the topcoat elastomer layer 6 may include fillers other than carbon black such as metal oxides and hydroxides such as MgO, $Al_2O_3$, CuO, $Ca(OH)_2$ and the like.

The elastomer material for the base coat elastomer layer 4 and the topcoat elastomer layer 6 is preferably a fluoropolymer, such as monomers or polymers of fluorinated ethylene propylene (FEP), perfluoroalkoxy resin (FPA), polytetrafluoroethylene (PTFE), other TEFLON®-like polymers, and mixtures thereof. Particularly preferred elastomers include fluoroelastomers. Examples of preferred fluoroelastomers include those described in detail in U.S. Pat. No. 5,166,031, 5,281,506, 5,366,772 and 5,370,931, together with U.S. Pat. Nos. 4,257,699, 5,017,432 and 5,061,965, the disclosures of which are incorporated by reference herein in their entirety. As described therein these fluoroelastomers, particularly from the class of copolymers and terpolymers of vinylidenefluoride, hexafluoropropylene and tetrafluoroethylene, and tetrapolymers of vinylidenefluoride, hexafluoropropylene, tetrafluoroethylene and a cure site monomer (examples of cure site monomers including 4-bromoperfluorobutene-1, 1,1-dihydro-4-bromoperfluorobutene-1,3-bromoperfluoropropene-1, 1,1-dihydro-3-bromoperfluoropropene-1, and commercially available cure site monomers available from, for example, DuPont) are known commercially under various designations as VITON A®, VITON E®, VITON E60C®, VITON E430®, VITON 910®, VITON GH®, VITON B50®, VITON E45®, and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the TECNOFLONs identified as FOR-60KIR®, FOR-LHF®, NM® FOR-THF®, FOR-TFS®, TH®, TN505® available from Montedison Specialty Chemical Company.

Specific examples of fluoroelastomers include those which contain one or both of hexafluoropropylene and tetrafluoroethylene as comonomers. Two preferred known fluoroelastomers are (1) a class of copolymers of vinylidenefluoride and hexafluoropropylene known commercially as VITON A® and (2) a class of terpolymers of vinylidenefluoride, hexafluoropropylene and tetrafluoroethylene known commercially as VITON B®.

In another preferred embodiment, the fluoroelastomer is one having a relatively low quantity of vinylidenefluoride, such as in VITON GF®. The VITON GF® is a tetrapolymer having 35 mole percent of vinylidenefluoride, 34 mole percent of hexafluoropropylene, 29 mole percent of tetrafluoroethylene, and 2 mole percent cure site monomer.

Examples of fluoroelastomers suitable for use herein include fluoroelastomer such as those listed above, along with volume grafted elastomers. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures each of which are herein incorporated by reference in their entirety.

Volume graft, in embodiments, refers to a substantially uniform integral-interpenetrating network of a hybrid composition, wherein both the structure and the composition of the fluoroelastomer and polyorganosiloxane are substantially uniform when taken through different slices of the fuser member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arranged.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer.

In embodiments, the polyorganosiloxane having functionality according to the present invention has the formula:

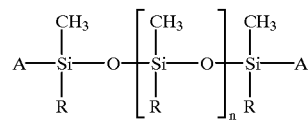

where R is an alkyl from about 1 to about 24 carbons, or an alkenyl of from about 2 to about 24 carbons, or a substituted or unsubstituted aryl of from about 6 to about 18 carbons; A is an aryl of from about 6 to about 24 carbons, a substituted or unsubstituted alkene of from about 2 to about 8 carbons, or a substituted or unsubstituted alkyne of from about 2 to about 8 carbons; and n represents the number of segments and is, for example, from about 2 to about 400, and preferably from about 10 to about 200 in embodiments.

In preferred embodiments, R is an alkyl, alkenyl or aryl, wherein the alkyl has from about 1 to about 24 carbons, preferably from about 1 to about 12 carbons; the alkenyl has from about 2 to about 24 carbons, preferably from about 2 to about 12 carbons; and the aryl has from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

Preferably, the base coat layer 4 and topcoat layer 6 are formed by dissolving a fluoroelastomer in a solvent such as methyl ethyl ketone, methyl isobutyl ketone, and like solvents. Various fillers, crosslinking agents and curative agents are added to the dissolved fluoroelastomer to facilitate crosslinking, to enhance surface properties, and to absorb reaction by-products. Examples of suitable crosslinking agents include amino silanes, $Ca(OH)_2$, peroxides, and the like. Examples of suitable curing agents include bisphenols such as VC-50®, and like curing agents. Examples of other additives include MgO, synthetic hydrotalcite, carbon black, CuO, $Ca(OH)_2$, and like additives.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, and processing aids.

After the elastomer is dissolved in a solvent, a primer or adhesive material is added to the elastomer solution along with crosslinking agents, curing agents and other additives. Preferable primer or adhesive materials include substituted or unsubstituted siloxane materials, and preferably, vinyl siloxanes such as ethylene siloxane, propylene siloxane, butylene siloxane and the like; acetoxy vinyl siloxanes; aliphatic vinyl siloxanes such as methyl vinyl siloxane, ethyl vinyl siloxane, propyl vinyl siloxane, butyl vinyl siloxane, and like aliphatic vinyl siloxanes; and the like. Commercially available primer or adhesives include, for example, DC6060 from Dow Corning, DY39-012 from Toray, and DC Silicone or P5200 from Dow Corning. A particularly preferred vinyl siloxane is a methyl vinyl siloxane such as dimethyl methyl vinyl siloxane which may be optionally acetoxy terminated. A preferred commercially available vinyl siloxane primer adhesive comprises the following ingredients: isopropoxy bis(acetylacetonate) titanium, ethyl polysilicate and dimethyl methyl vinyl siloxane which is preferably acetoxy terminated.

The adhesive primer is present in an amount of from about 30 to about 50 percent, and preferably from about 35 to about 45 percent by weight of total solids. Preferably, the adhesive is added in an amount of about 10 to about 20 percent to give from about 20 to about 30 percent solids in final solution. Total solids as used herein refers to the total weight of the elastomer, primer adhesive, crosslinking and curing agents, and any fillers or other additives. The elastomer is present in an amount of from about 35 to about 45 percent by weight of total solids. Preferably, the elastomer is added in an amount of about 10 to about 20 percent to give from about 20 to about 30 percent solids in final solution.

The resulting elastomer/primer solution is then used to fabricate the outer layer of a fuser member by conventional solution coating methods spraying, dipping, flow coating, or the like.

This thickness range is selected to provide a layer thin enough to prevent a large thermal barrier for fusing and thick enough to allow a reasonable wear life. While molding, extruding and wrapping techniques are alternative means which may be used, it is preferred to flow coat the base coat and topcoat to the fuser member. Preferred flow coating techniques are described in U.S. patent. application Ser. No. 08/822,521 filed Mar. 26, 1997, and U.S. patent application Ser. No. 08/824,576 filed Mar. 26, 1997, the entire disclosures of which are hereby incorporated by reference in their entirety.

In an alternative embodiment, a heat absorbent coating can be coated on an internal area of the fuser member. Examples of preferred commercially available heat absorbent coatings include a carbon dag, Dag 580 (graphite suspension in denatured alcohol solvent) by Acheson Colloids Company or a Tenax 157T-27 high heat resisting black hydrolux coating supplied by Tenax Finishing Products Company, Newark, N.J. However, any coating which has heat absorbent properties can be used.

The present invention greatly reduces the cost and time associated with providing an elastomer surface on a supporting substrate. Specifically, the present invention dispenses with the additional timing associated with coating the primer or adhesive layers prior to coating the elastomer layers thereto. In addition, the base coat and topcoat layers have increased adhesion which ensures a longer functional life of the fuser member. Moreover, the preferred embodiment wherein the topcoat elastomer layer is carbon free, provides improved release properties of the fuser member and higher level of gloss to the final copy or print quality.

All the patents and applications referred to herein are hereby specifically, and totally incorporated herein by reference in their entirety.

The following Examples further define and describe embodiments of the present invention. Unless otherwise indicated, all parts and percentages are by weight.

EXAMPLES

Example I

A fuser roller was coated with silicone rubber (Dow Corning Silastic HTV rubber with a hardness of 60° A.) to a thickness of about 3 mm. Next, a fluoroelastomer (Dyneon FE5840Q supplied by Avon Technical Products Limited as AA969) layer was flow coated onto the silicone rubber layer. For a detailed explanation of a preferred method of flow coating, see U.S. patent application Ser. No. 08/822,521, filed Mar. 2, 1997, entitled, "Flow Coating Solution and Fuser Member Layers Prepared Therewith;" and U.S. patent application Ser. No. 08/824,576, filed Mar. 2, 1997, entitled, "Fuser Member with an Amino Silane Adhesive Layer and Preparation Thereof," the subject matter of both of these applications is hereby incorporated herein in their entirety. Roll 1 had CHEMLOCK® 5150 hesive obtained from Loctite Adhesives brushed onto the roll prior to coating, whereas Roll 2 had no adhesive applied to it.

The following Table 1 contains peel test data collected to demonstrate the effectiveness of use of an adhesive (Roll 1) versus no use of an adhesive (Roll 2). Peel tests where carried out using a Hounsfield H10KS/0272 tensometer with a 25N S Series load cell. The peel rate used for all tests was 50 mm/min and all samples were 22 mm in width. Five samples were taken from each roll, a representative data set being presented as well as the mean peel strength and maximum peel strength for the sample set.

TABLE 1

Table showing data from peel testing of Rolls 1 and 2

| Extension (mm) | Roll 1 Force kg/f | Roll 2 Force kg/f |
| --- | --- | --- |
| 1 | 0.0451 | 0.0257 |
| 2 | 0.1514 | 0.1366 |
| 3 | 0.2646 | 0.1978 |
| 4 | 0.3633 | 0.2631 |
| 5 | 0.4168 | 0.2733 |
| 6 | 0.4306 | 0.2798 |
| 7 | 0.442 | 0.2859 |
| 8 | 0.4505 | 0.2945 |
| 9 | 0.4604 | 0.3018 |
| 10 | 0.4788 | 0.3112 |
| 11 | 0.4681 | 0.3206 |
| 12 | 0.4788 | 0.3292 |
| 13 | 0.4872 | 0.3369 |
| 14 | 0.4902 | 0.3487 |
| 15 | 0.504 | 0.3557 |
| 16 | 0.5132 | 0.3565 |
| 17 | 0.5246 | 0.3565 |
| 18 | 0.5216 | 0.354 |
| 19 | 0.53 | 0.3557 |
| 20 | 0.517 | 0.3557 |
| 21 | 0.5231 | 0.3614 |
| 22 | 0.5185 | 0.3589 |
| 23 | 0.5155 | 0.3569 |
| 24 | 0.5254 | 0.3577 |
| 25 | 0.5338 | 0.3536 |
| 26 | 0.5239 | 0.3589 |
| 27 | 0.5254 | 0.363 |
| 28 | 0.5445 | 0.3589 |
| 29 | 0.5162 | 0.3569 |
| 30 | 0.5178 | 0.3593 |
| 31 | 0.5208 | 0.361 |
| 32 | 0.5224 | 0.3618 |
| 33 | 0.5224 | 0.3622 |
| 34 | 0.5262 | 0.3634 |
| 35 | 0.5323 | 0.3655 |
| 36 | 0.5346 | 0.3671 |
| 37 | 0.5354 | 0.3695 |
| 38 | 0.5315 | 0.3728 |
| 39 | 0.5331 | 0.3724 |
| 40 | 0.5116 | 0.3761 |
| 41 | 0.5231 | 0.3753 |
| 42 | 0.5239 | 0.3724 |
| 43 | 0.5308 | 0.3724 |
| 44 | 0.5346 | 0.372 |
| 45 | 0.5598 | 0.374 |
| 46 | 0.5246 | 0.3691 |
| 47 | 0.5269 | 0.3732 |
| 48 | 0.5323 | 0.3748 |
| 49 | 0.5384 | 0.3793 |
| 50 | 0.5415 | 0.3834 |
| 51 | 0.5331 | 0.3875 |
| 52 | 0.5445 | 0.3471 |
| 53 | 0.5537 | 0.3573 |
| 54 | 0.5369 | 0.3724 |
| 55 | 0.5331 | 0.3789 |
| 56 | 0.5254 | 0.3846 |
| 57 | 0.5277 | 0.3948 |
| 58 | 0.53 | 0.394 |
| 59 | 0.5315 | 0.3532 |
| 60 | 0.5552 | 0.3663 |
| 61 | 0.5376 | 0.3806 |
| 62 | 0.5178 | 0.3891 |
| 63 | 0.5216 | 0.3895 |
| 64 | 0.5292 | 0.3912 |
| 65 | 0.5285 | 0.3504 |
| 66 | 0.5285 | 0.3581 |
| 67 | 0.5476 | 0.3704 |
| 68 | 0.5376 | 0.3838 |
| 69 | 0.5415 | 0.3944 |
| 70 | 0.5407 | 0.3944 |
| 71 | 0.5399 | 0.3969 |
| 72 | 0.5208 | 0.3373 |
| 73 | 0.5262 | 0.3353 |
| 74 | 0.5323 | 0.3414 |
| 75 | 0.5354 | 0.3492 |
| 76 | 0.5308 | 0.3557 |
| 77 | 0.5155 | 0.3614 |
| 78 | 0.5063 | 0.3683 |
| 79 | 0.5109 | 0.3394 |
| 80 | 0.5185 | 0.3402 |
| 81 | 0.5185 | 0.3459 |
| 82 | 0.5254 | 0.3512 |
| 83 | 0.53 | 0.3414 |
| 84 | 0.5315 | 0.3443 |
| 85 | 0.5338 | 0.3512 |
| 86 | 0.5323 | 0.3606 |
| 87 | 0.5338 | 0.3687 |
| 88 | 0.5392 | 0.3753 |
| 89 | 0.5422 | 0.3814 |
| 90 | 0.5491 | 0.3757 |
| 91 | 0.5659 | 0.3777 |
| 92 | 0.5461 | 0.3806 |
| 93 | 0.4933 | 0.383 |
| 94 | 0.4963 | 0.3496 |
| 95 | 0.5048 | 0.339 |
| 96 | 0.5086 | 0.3402 |
| 97 | 0.5094 | 0.3467 |
| 98 | 0.5124 | 0.3549 |
| 99 | 0.5224 | 0.3434 |
| 100 | 0.5315 | 0.3414 |
| 101 | 0.53 | 0.3471 |
| 102 | | 0.3549 |
| 103 | | 0.3606 |
| 104 | | 0.3394 |
| 105 | | 0.3402 |
| 106 | | 0.3447 |
| 107 | | 0.3512 |
| 108 | | 0.3573 |
| mean force (gf/cm) over 5 samples | 238.9 | 161.5 |
| Standard deviation | 1.389 | 4.01 |
| max force per unit width (gf/cm) | 254.9 | 177.4 |
| Standard deviation | 3.348 | 6.642 |

The above results demonstrate that the fuser roll with the combined adhesive primer and basecoat layer (Roll 1) offers superior peel strength to the fuser roll containing no adhesive at all (Roll 2).

Figure 3:
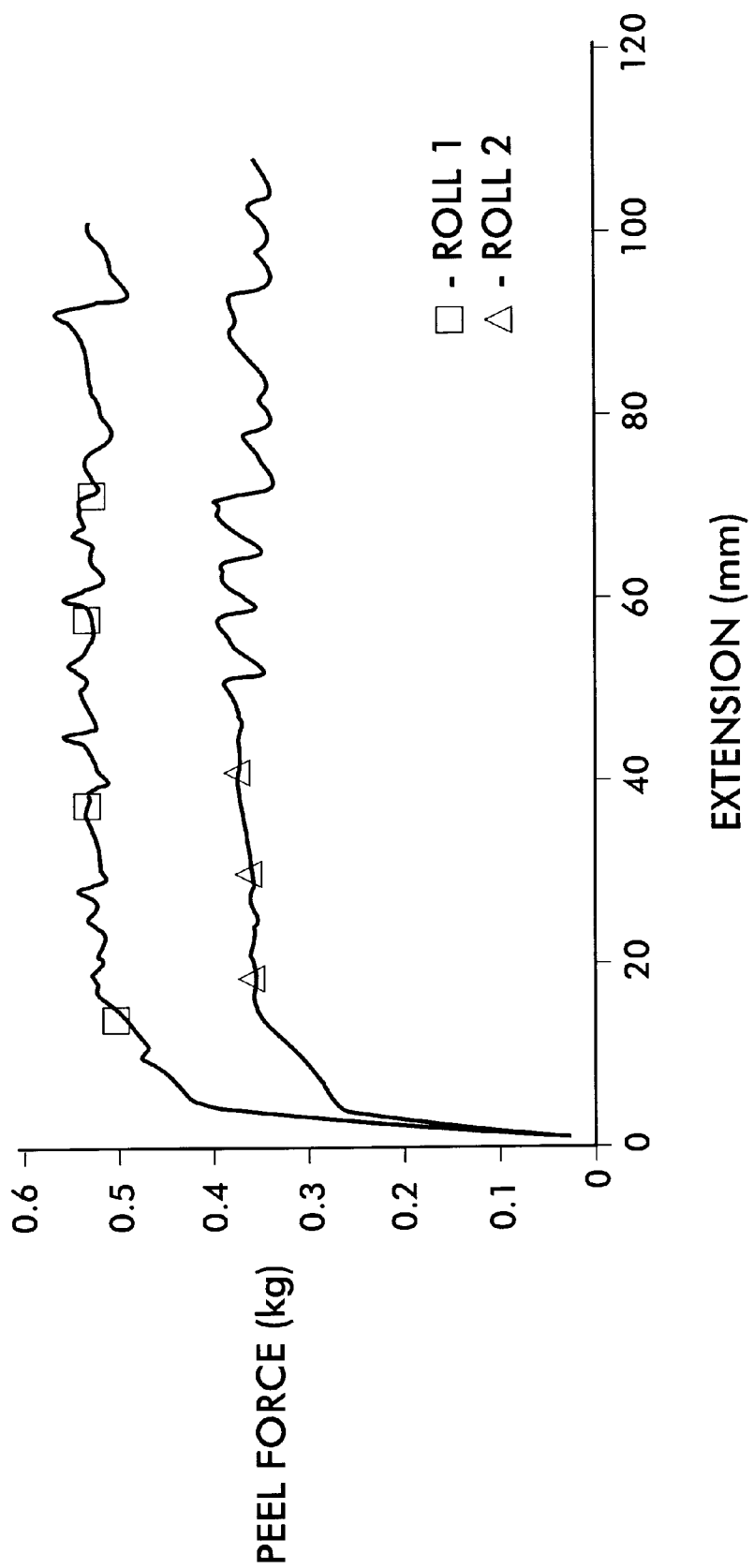
FIG. 3 is a graph showing peel strength (kg) for the fuser rollers prepared with the presence of an adhesive (Roll 1) and without the presence of an adhesive (Roll 2).
Figure 4:
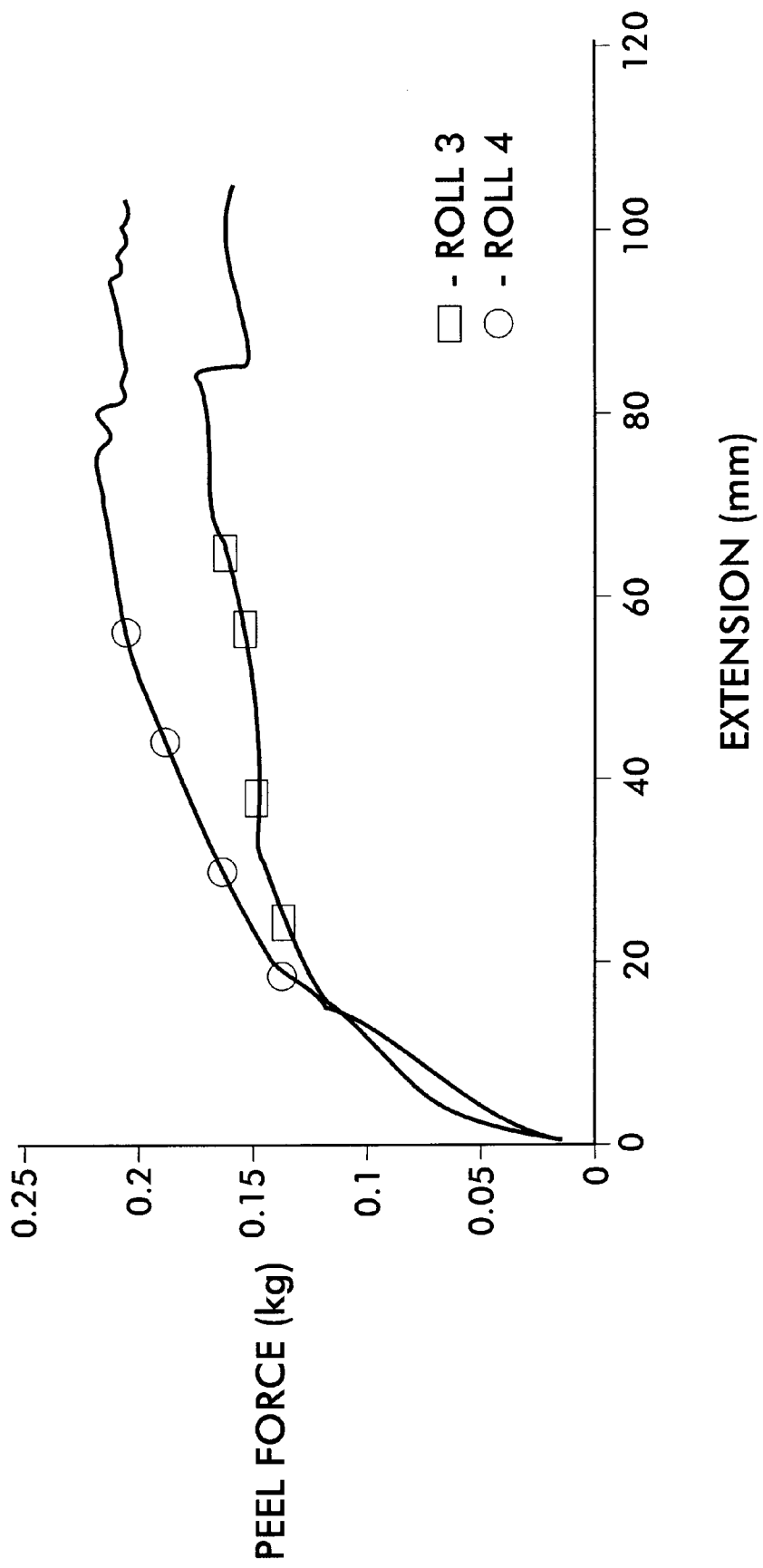
FIG. 4 is a graph showing peel strength (kg) for the fuser rollers prepared with an adhesive coating and fluoroelastomer outer coating (Roll 3) and prepared with a composition of adhesive and fluoroelastomer as the outer coating (Roll 4).

FIG. 3 is a graph showing peel strength (kg) for the fuser rollers prepared in accordance with Example 1. It is clear from the graph that the fuser roll with the combined adhesive primer (Roll 1) and basecoat layer offers superior peel strength to the fuser roll without any adhesive primer (Roll 2).

Example II

The following Table 2 contains the peel strength data for two additional rolls. Roll 3 is a roll manufactured by UV treating the roller, coating the roller with an adhesive (Toray Dow Corning DY9-051), coating the adhesive with a fluoroelastomer basecoat (Daikin Industries F969), followed by coating with a fluoroelastomer topcoat (Daikin Industries F960). Roll 4 is a roll which underwent UV treatment prior to coating with an adhesive/basecoat composition in accordance with a preferred embodiment of the invention. The adhesive/basecoat composition was prepared by mixing from about 58 to about 60 weight percent methyl isobutyl ketone (MIBK) solvent, from about 25 to about 27 weight percent fluoroelastomer compound (Dyneon FE 5840Q supplied by Avon Technical Products Ltd. as AA969), from about 16 to about 18 weight percent DC6060 adhesive (supplied by Dow Corning). The topcoat was prepared by mixing from about 72 to about 76 weight percent MiBK solvent with from about 24 to about 28 weight percent fluoroelastomer compound (Dyneon FE 5830Q supplied by Avon Technical Products Ltd. as AA960). Both basecoat and topcoat layers were coated on the roller to a thickness of from about 12 to about 18 mm.

TABLE 2

Table showing data from peel testing of Rolls 3 and 4

| Extension (mm) | Roll 3 Force kg/f | Roll 4 Force kg/f |
|---|---|---|
| 1 | 0.0163 | 0.0158 |
| 2 | 0.033 | 0.0286 |
| 3 | 0.0467 | 0.0387 |
| 4 | 0.0583 | 0.0467 |
| 5 | 0.0679 | 0.0533 |
| 6 | 0.0751 | 0.0586 |
| 7 | 0.0806 | 0.0635 |
| 8 | 0.085 | 0.0681 |
| 9 | 0.0887 | 0.076 |
| 10 | 0.0924 | 0.0808 |
| 11 | 0.0959 | 0.0862 |
| 12 | 0.0997 | 0.0918 |
| 13 | 0.1038 | 0.0984 |
| 14 | 0.1083 | 0.1063 |
| 15 | 0.113 | 0.1137 |
| 16 | 0.1173 | 0.1216 |
| 17 | 0.1216 | 0.1224 |
| 18 | 0.1248 | 0.1292 |
| 19 | 0.1273 | 0.1354 |
| 20 | 0.1295 | 0.14 |
| 21 | 0.1311 | 0.1448 |
| 22 | 0.1328 | 0.1486 |
| 23 | 0.134 | 0.1512 |
| 24 | 0.135 | 0.1537 |
| 25 | 0.1362 | 0.1558 |
| 26 | 0.1383 | 0.1581 |
| 27 | 0.1401 | 0.1596 |
| 28 | 0.1421 | 0.1614 |
| 29 | 0.1442 | 0.1632 |
| 30 | 0.1458 | 0.1647 |
| 31 | 0.1468 | 0.1672 |
| 32 | 0.1485 | 0.1693 |
| 33 | 0.1499 | 0.1716 |
| 34 | 0.1503 | 0.1734 |
| 35 | 0.1499 | 0.1754 |
| 36 | 0.1503 | 0.1767 |
| 37 | 0.1501 | 0.1779 |
| 38 | 0.1497 | 0.1802 |
| 39 | 0.1503 | 0.1815 |
| 40 | 0.1505 | 0.1828 |
| 41 | 0.1497 | 0.1843 |
| 42 | 0.1501 | 0.1861 |
| 43 | 0.1499 | 0.1879 |
| 44 | 0.1495 | 0.1889 |
| 45 | 0.1501 | 0.1907 |
| 46 | 0.1503 | 0.1925 |
| 47 | 0.1505 | 0.1937 |
| 48 | 0.1509 | 0.1958 |
| 49 | 0.1513 | 0.1971 |
| 50 | 0.1519 | 0.1983 |
| 51 | 0.1526 | 0.1996 |
| 52 | 0.1538 | 0.2006 |
| 53 | 0.1544 | 0.2022 |
| 54 | 0.1548 | 0.2037 |
| 55 | 0.1556 | 0.205 |
| 56 | 0.1566 | 0.206 |
| 57 | 0.1574 | 0.207 |
| 58 | 0.1581 | 0.2078 |
| 59 | 0.1585 | 0.2088 |
| 60 | 0.1589 | 0.2098 |
| 61 | 0.1593 | 0.2111 |
| 62 | 0.1603 | 0.2116 |
| 63 | 0.1617 | 0.2124 |
| 64 | 0.1625 | 0.2121 |
| 65 | 0.1632 | 0.2126 |
| 66 | 0.1636 | 0.2136 |

TABLE 2-continued

Table showing data from peel testing of Rolls 3 and 4

| Extension (mm) | Roll 3 Force kg/f | Roll 4 Force kg/f |
|---|---|---|
| 67 | 0.165 | 0.2147 |
| 68 | 0.1666 | 0.2154 |
| 69 | 0.1685 | 0.2154 |
| 70 | 0.1701 | 0.2169 |
| 71 | 0.1713 | 0.2167 |
| 72 | 0.1717 | 0.218 |
| 73 | 0.1717 | 0.219 |
| 74 | 0.1715 | 0.2203 |
| 75 | 0.1705 | 0.221 |
| 76 | 0.1717 | 0.2215 |
| 77 | 0.1717 | 0.2215 |
| 78 | 0.1719 | 0.2187 |
| 79 | 0.1721 | 0.2149 |
| 80 | 0.1725 | 0.2182 |
| 81 | 0.1729 | 0.2192 |
| 82 | 0.1734 | 0.2195 |
| 83 | 0.174 | 0.2078 |
| 84 | 0.1748 | 0.2096 |
| 85 | 0.1756 | 0.2116 |
| 86 | 0.176 | 0.2083 |
| 87 | 0.1558 | 0.208 |
| 88 | 0.1536 | 0.2103 |
| 89 | 0.1546 | 0.2111 |
| 90 | 0.155 | 0.2098 |
| 91 | 0.1558 | 0.2101 |
| 92 | 0.1566 | 0.2116 |
| 93 | 0.1581 | 0.2121 |
| 94 | 0.1589 | 0.2131 |
| 95 | 0.1601 | 0.2144 |
| 96 | 0.1613 | 0.2152 |
| 97 | 0.1619 | 0.2101 |
| 98 | 0.1627 | 0.2106 |
| 99 | 0.1632 | 0.2124 |
| 100 | 0.1634 | 0.2085 |
| 101 | 0.1638 | 0.209 |
| 102 | 0.1636 | 0.2106 |
| 103 | 0.1632 | 0.208 |
| 104 | 0.1623 | 0.209 |
| 105 | 0.1619 | 0.209 |
| 106 | 0.1617 | |
| 107 | 0.1615 | |
| 108 | | |
| Mean force (gf/cm) over 5 samples | 67.25 | 99.19 |
| Standard deviation | 5.191 | 1.932 |
| Max force per unit width (gf/cm) | 73.2 | 103.0 |
| Standard deviation | 4.538 | 3.595 |

It can clearly be seen that the roll having the combined primer and basecoat layer Roll 4) offers unexpectedly superior results in terms of peel strength to the roll having separate primer and basecoat layers (Roll 3).

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A method for providing an elastomer surface on a fuser member supporting substrate comprising:
    a) dissolving a fluoroelastomer in a solvent;
    b) subsequently adding an adhesive primer to form a fluoroelastomer and primer solution, wherein said primer comprises a vinyl siloxane; and
    c) subsequently providing at least one layer of said fluoroelastomer and primer solution to an outer surface of said supporting substrate to form a topcoat layer.

2. A method in accordance with claim 1, wherein said primer comprises a vinyl siloxane selected from the group consisting of ethylene siloxanes, propylene siloxanes, butylene siloxanes, methyl vinyl siloxanes, ethyl vinyl siloxanes, propyl vinyl siloxanes, and butyl vinyl siloxanes.

3. A method in accordance with claim 1, wherein said vinyl siloxane is acetoxy terminated.

4. A method in accordance with claim 1, wherein said primer further comprises isopropoxy bis(acetylacetonate) titanium and ethyl polysilicate.

5. A method in accordance with claim 1, wherein said solvent is selected from the group consisting of methyl ethyl ketone and methyl isobutyl ketone.

6. A method in accordance with claim 1, further comprising prior to (a)
   1) dissolving a fluoroelastomer in a solvent;
   2) adding an adhesive primer and thermally conductive filler to form a filled fluoroelastomer and primer solution, wherein said primer comprises a vinyl siloxane; and
   3) subsequently providing at least one layer of said filled fluoroelastomer and primer solution to an outer surface of said supporting substrate to form a base coat layer.

7. A method in accordance with claim 6, wherein said filler is selected from the group consisting of metal oxides, graphite, and carbon black.

8. A method in accordance with claim 7, wherein said filler is carbon black.

9. A method in accordance with claim 6, wherein said filler is added in an amount of from about 0.1 to about 10 percent by weight of total solids.

10. A method in accordance with claim 9, wherein said filler is added in an amount of from about 3 to about 7 percent by weight of total solids.

11. A method in accordance with claim 1, wherein said fluoroelastomer is selected from the group consisting of a) copolymers of vinylidene fluoride, hexafluoropropylene and tetrafluoroethylene b) terpolymers of vinylidene fluoride, hexafluoropropylene and tetrafluoroethylene, and c) tetrapolymers of vinylidene fluoride, hexafluoropropylene, tetrafluoroethylene and a cure site monomer.

12. A method in accordance with claim 11, wherein said fluoroelastomer comprises 35 mole percent of vinylidenefluoride, 34 mole percent of hexafluoropropylene, 29 mole percent of tetrafluoroethylene and 2 mole percent of a cure site monomer.

13. A method in accordance with claim 1, further comprising the following:
   i) providing a heat absorbent coating on an internal area of said fuser member supporting substrate.

14. A method in accordance with claim 13, further comprising after (i):
   ii) providing an adhesive layer on an outer surface of said fuser member supporting substrate.

15. A method in accordance with claim 14, further comprising after (ii):
   iii) providing an intermediate layer on said adhesive layer.

16. A method in accordance with claim 15, wherein said intermediate layer comprises a silicone elastomer.

17. A method in accordance with claim 1, wherein said topcoat layer is carbon black free.

18. A method for providing an elastomer surface on a fuser member supporting substrate comprising:
   i) providing a heat absorbent coating on an internal area of said fuser member supporting substrate;
   ii) providing an adhesive layer on an outer surface of said fuser member supporting substrate;
   iii) providing an intermediate layer on said adhesive layer;
   iv) forming a base coat layer comprising dissolving a fluoroelastomer in a solvent, adding an adhesive primer and thermally conductive filler to form a filled fluoroelastomer and primer solution, wherein said adhesive primer comprises a vinyl siloxane, and subsequently providing at least one layer of said fluoroelastomer and primer solution to said intermediate layer to form a base coat layer; and
   v) forming a topcoat layer comprising dissolving a fluoroelastomer in a solvent, adding an adhesive primer to form a fluoroelastomer and primer solution, wherein said adhesive primer comprises a vinyl siloxane, and subsequently providing at least one layer of said fluoroelastomer and primer solution on said base coat layer to form a topcoat layer.

19. A method in accordance with claim 18, wherein said intermediate layer comprises a silicone elastomer.

20. A method in accordance with claim 18, wherein said filler is selected from the group consisting of carbon black, graphite, and metal oxides.

21. A method for providing an elastomer surface on a fuser member supporting substrate comprising:
   a) dissolving a fluoroelastomer in a solvent;
   b) adding an adhesive primer and thermally conductive filler to form a filled fluoroelastomer and primer solution, wherein said primer comprises a vinyl siloxane;
   c) subsequently providing at least one layer of said filled fluoroelastomer and primer solution to an outer surface of said supporting substrate to form a base coat layer;
   e) dissolving a fluoroelastomer in a solvent;
   f) adding an adhesive primer to form a fluoroelastomer and primer solution, wherein said primer comprises a vinyl siloxane; and
   g) subsequently providing at least one layer of said fluoroelastomer and primer solution to said base coat to form a topcoat layer.

22. A method in accordance with claim 21, wherein said topcoat layer is carbon black free.

23. A method in accordance with claim 21, wherein said filler is carbon black.

* * * * *